United States Patent [19]

Ishii et al.

[11] Patent Number: 5,148,092
[45] Date of Patent: Sep. 15, 1992

[54] STEPPING MOTOR DRIVING CIRCUIT HAVING FAILSAFE FUNCTION

[75] Inventors: Yukihisa Ishii; Shinichi Inagawa, both of Wako, Japan

[73] Assignee: Honda Giken Kogyo K.K., Tokyo, Japan

[21] Appl. No.: 736,032

[22] Filed: Jul. 25, 1991

[30] Foreign Application Priority Data

Aug. 9, 1990 [JP] Japan .................. 2-212230

[51] Int. Cl.⁵ .............................................. H02P 8/00
[52] U.S. Cl. ...................................... 318/696; 318/685
[58] Field of Search ........................... 318/685, 696

*Primary Examiner*—William M. Shoop, Jr.
*Assistant Examiner*—Karen Masih
*Attorney, Agent, or Firm*—Arthur L. Lessler

[57] ABSTRACT

A driving circuit for driving a stepping motor has a plurality of excitation coils, a plurality of excitation transistors for driving the excitation coils of the stepping motor, respectively, at least one chopping transistor for effecting chopping control of current flowing to the excitation coils, and a CPU for supplying at least one control signal to the at least one chopping transistor. High and low pulse duty factor detecting circuits detect whether the at least one control signal has a pulse duty factor thereof falling outside a predetermined range defined by predetermined upper and lower limit values. The CPU is responsive to outputs from the high and low pulse duty factor detecting circuits for interrupting the supply of current to the stepping motor when the latter detect that the pulse duty factor falls outside the predetermined range.

3 Claims, 2 Drawing Sheets

STEPPING MOTOR DRIVING CIRCUIT HAVING FAILSAFE FUNCTION

BACKGROUND OF THE INVENTION

This invention relates to a driving circuit for driving a stepping motor, and more particularly to a stepping motor driving circuit which has a failsafe function for protecting the circuit in the event of an electrical fault in the circuit.

Conventionally, a stepping motor driving circuit is generally provided with a protective device which is operable to protect the circuit in the event of a short circuit between a circuit element and wiring or the like, by preventing the stepping motor and/or circuit elements from being damaged or broken by excessive current (overcurrent) flowing in the motor and/or the circuit elements.

The conventional protective device includes the following types:

i) a type employing a fuse which is cut by overcurrent;

ii) a type employing a resistance having a low resistance value and arranged in the driving circuit at a suitable place for detecting overcurrent such that a relay or like means is actuated upon detection of overcurrent by the resistance to cut off the supply of driving current to the stepping motor; and iii) a type having means for applying driving pulses to the stepping motor and detecting the rotational angle of the motor driven by the pulses, means for detecting a fault in the driving circuit based upon the detected rotational angle and the number of driving pulses applied to the motor; and means for cutting off the supply of driving current to the motor upon detection of a fault.

The above type i) suffers from low responsiveness, and the type ii) has a drawback of large heat loss due to the use of a resistance. On the other hand, the type iii) is not capable of selectively detecting only electrical faults, since it can erroneously judge that a fault has occurred, even when the means for detecting the rotational angle becomes faulty, when the motor skips, or when there takes place a mechanical fault.

SUMMARY OF THE INVENTION

It is the object of the invention to provide a stepping motor driving circuit, which has a failsafe means which is capable of promptly and selectively detecting only electrical faults, and also capable of performing a failsafe action for preventing damage to or breakage of the motor and its related parts due to overcurrent, etc.

To attain the above object, the present invention provides a driving circuit for driving a stepping motor having a plurality of excitation coils having different phases, comprising:

a plurality of excitation transistors for driving the excitation coils of the stepping motor, respectively;

at least one chopping transistor for effecting chopping control of current flowing to the excitation coils;

control means for supplying at least one control signal to the at least one chopping transistor;

detecting means for detecting whether the at least one control signal has a pulse duty factor thereof falling outside a predetermined range defined by predetermined upper and lower limit values; and interrupting means responsive to output from the detecting means for forcedly interrupting the supply of current to the stepping motor when the detecting means detects that the pulse duty factor falls outside the predetermined range.

Preferably, the detecting means comprises a high pulse duty factor detecting circuit for detecting whether the pulse duty factor of the at least one control signal is higher than the predetermined upper limit value, and a low pulse duty factor detecting circuit for detecting whether the pulse duty factor of the at least one control signal is lower than the predetermined lower limit value.

Further preferably, the interrupting means causes the excitation transistors to be forcedly turned off when the high pulse duty factor detecting circuit detects that the pulse duty factor of the at least one control signal is higher than the predetermined upper limit value, and causes the at least one chopping transistor to be forcedly turned off when the low pulse duty factor detecting circuit detects that the pulse duty factor is lower than the predetermined lower limit value.

The above and other objects, features, and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
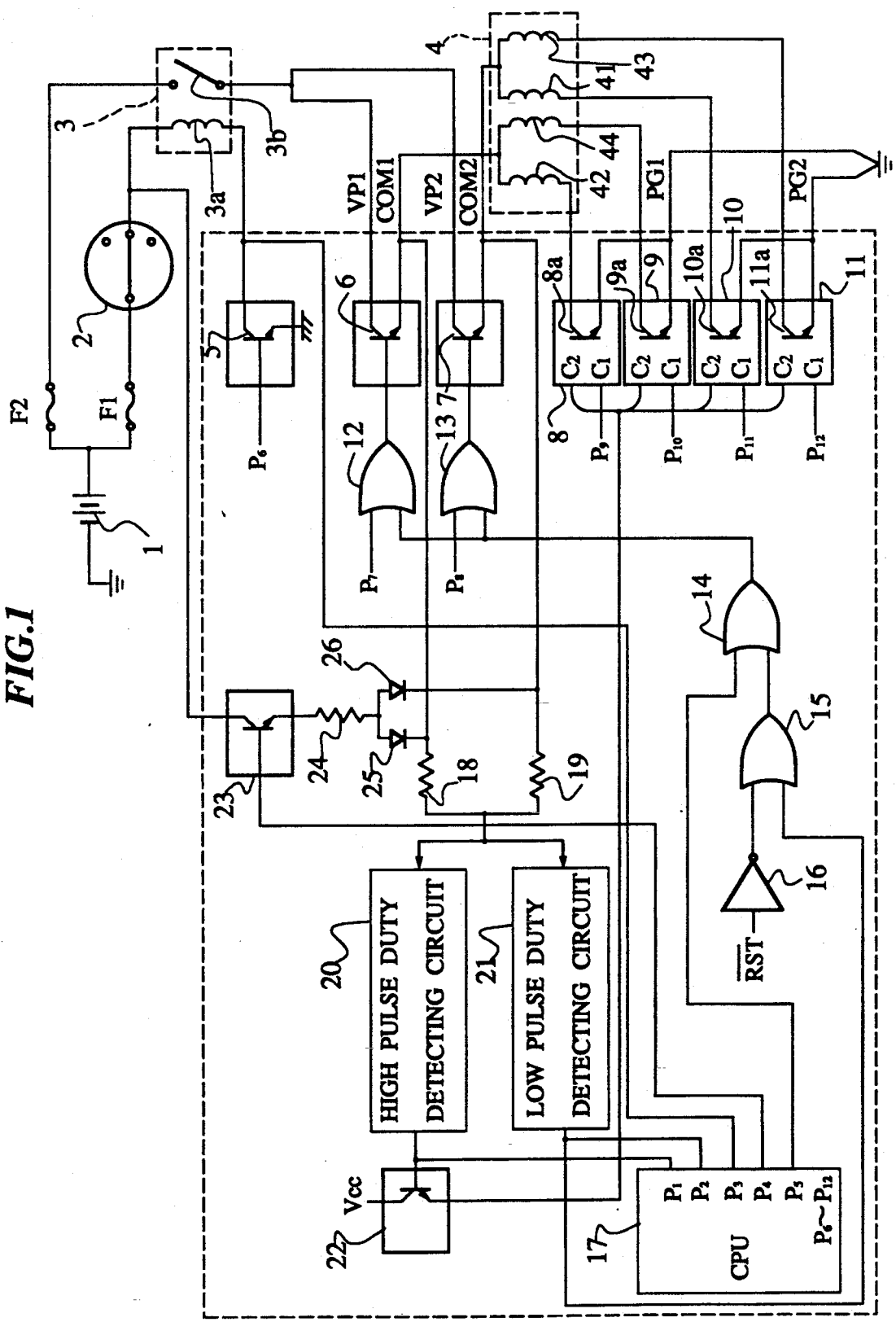
FIG. 1 is a circuit diagram of a stepping motor driving circuit according to an embodiment of the invention.

Referring first to FIG. 1, there is shown the arrangement of a stepping motor and a driving circuit for driving same according to an embodiment of the invention. The stepping motor in the illustrated embodiment is adapted for use in automotive vehicles.

In the figure, reference numeral 1 designates a battery, which has a negative electrode thereof grounded and a positive electrode thereof connected to an ignition switch 2 of an automotive vehicle, not shown, and a switch element 3b of a relay 3 via fuses $F_1$ and $F_2$, respectively. The ignition switch 2 is connected to a coil $3a$ of the relay 3. The coil $3a$ is in turn connected to the collector of a failsafe relay transistor (hereinafter referred to as "FSRTR") 5, as well as to an input port $P_3$ of a central processing unit (hereinafter referred to an "CPU") 17. The FSRTR 5 has its emitter grounded and its base connected to an output port $P_6$ of the CPU 17. With this arrangement, the FSRTR 5 is controlled to turn on and off by the CPU 17. When it is turned on, the switch element $3b$ of the relay 3 is closed.

The switch element $3b$ of the relay 3 is connected to chopping transistors (hereinafter referred to as "CHOPTR") 6, 7 by way of respective lines VP1 and VP2. The CHOPTR's 6, 7 have their collectors connected to second phase excitation coils 42 and 44, and first phase excitation coils 41 and 43 of a stepping motor 4, by way of respective lines $COM_1$ and $COM_2$. /the CHOPTR's 6, 7 have their bases connected to the output terminals of respective OR circuits 12 and 13. The OR circuits 12, 13 have one input terminals thereof connected to output ports $P_7$ and $P_8$ of the CPU 17, respectively, and other input terminals connected to the output of an OR circuit 14. The OR circuit 14 has one input terminal thereof connected to an output port $P_5$ of the CPU 17, and another input terminal connected to the output of an OR circuit 15. The output ports $P_7$, $P_8$ supply low level signals except when the CPU 17 carries out a fault diagnosis, and the OR circuit 15 generates a low level output except when a low pulse duty factor detecting circuit 21, hereinafter referred to, has detected a fault. Therefore, the CHOPTR's 6, 7 are controlled to turn on and off by a chopping pulse signal from the output port $P_5$ of the CPU 17. The chopping pulse signal has its pulse duty factor variable in response to output voltage $V_B$ from the battery 1 so that pulse duty factors of pulse signals on the lines $COM_1$, $COM_2$ are controlled within a predetermined range (3%-93% in the present embodiment). Thus, constant effective power is supplied to the stepping motor 4, irrespective of the output voltage $V_B$ from the battery 1.

Figure 2:
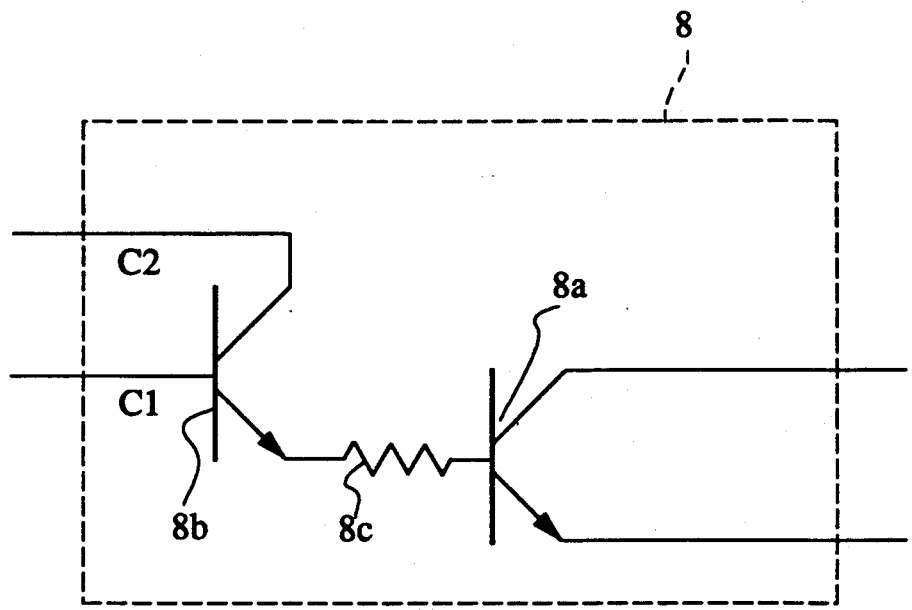
FIG. 2 is a circuit diagram showing the interior construction of a motor exciting circuit appearing in FIG. 1.

The excitation coils 41-44 of the stepping motor 4 are connected to the collectors of excitation transistors $10a$, $8a$, $11a$ and $9a$ (hereinafter referred to as "EXTR") of motor exciting circuits 10, 8, 11 and 9, respectively. As shown in FIG. 2, the motor exciting circuit 8 comprises an EXTR $8a$, a control transistor (hereinafter referred to as "CONTTRR") $8b$, and a resistance $8c$. The emitter of the CONTTR $8b$ is connected to the base of the EXTR $8a$ via the resistance $8c$, while the base and collector of the CONTTR $8b$ are connected to control input terminals $C_1$ and $C_2$ of the motor exciting circuit 8.

The other motor exciting circuits 9-11 have exactly the same construction with that of the motor exciting circuit 8, described above. The emitters of the EXTR's $8a$-$11a$ are grounded via respective lines PG1 and PG2.

The first control input terminals $C_1$ of the motor exciting circuits 8-11 are connected to respective output terminals $P_9$-$P_{12}$ of the CPU 17, and the second control input terminals $C_2$ thereof are connected to the collector of a phase cut transistor (hereinafter referred to as "PCUTTR") 22. The PCUTTR 22 has its emitter connected to a power supply Vcc which supplies positive voltage. With this arrangement, when the PCUTTR 22 is on, the second control input terminals $C_2$ of the exciting circuits 9-11 assume a high potential so that the EXTR's $8a$-$11a$ are turned on and off in response to pulse signals from the output ports $P_9$-$P_{12}$ of the CPU 17 connected to the first control input terminals $C_1$. Consequently, the exciting coils 41-44 are energized to drive the stepping motor 4.

The lines $COM_1$, $COM_2$ to which the collectors of the CHOPTR's 6, 7 are connected are connected to ends of respective resistances 18 and 19, which in turn have the other ends thereof connected with each other and also connected to input terminals of a high pulse duty factor detecting circuit (hereinafter referred to as "HDTY circuit") 20 and the low pulse duty factor detecting circuit (hereinafter referred to as "LDTY circuit") 21. The output of the HDTY circuit 20 is connected to the base of the PCUTTR 22 and to an input port $P_1$ of the CPU 17. The output of the LDTY circuit 21 is connected to an input port $P_2$ of the CPU 17 and one input terminal of the OR circuit 15. The OR circuit 15 has another input terminal thereof supplied with a resetting signal RST from resetting means, not shown, via an invertor 16, so that when reset, the invertor 16 generates a high level output. The output of the OR circuit 15 is connected to another input terminal of the OR circuit 14.

Figure 3:
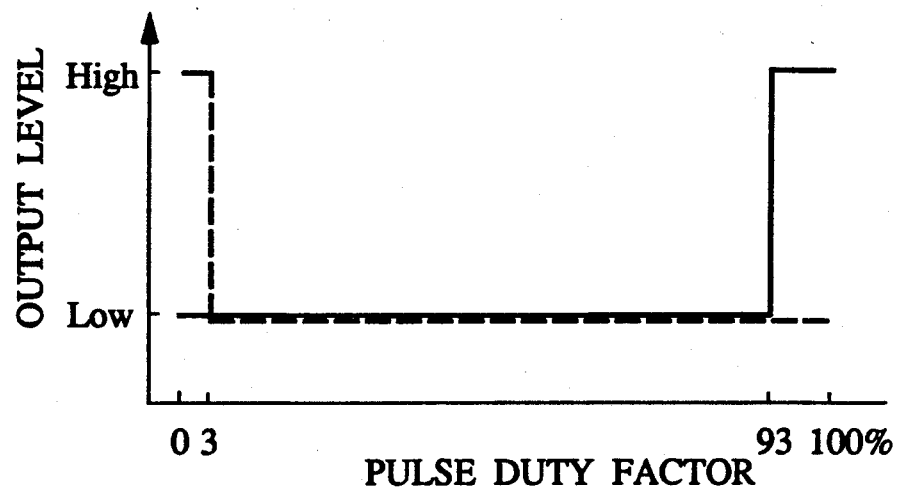
FIG. 3 is a graph showing input and output characteristics of a high pulse duty factor-detecting circuit and a low pulse duty factor-detecting circuit appearing in FIG. 1.
Figure 1:
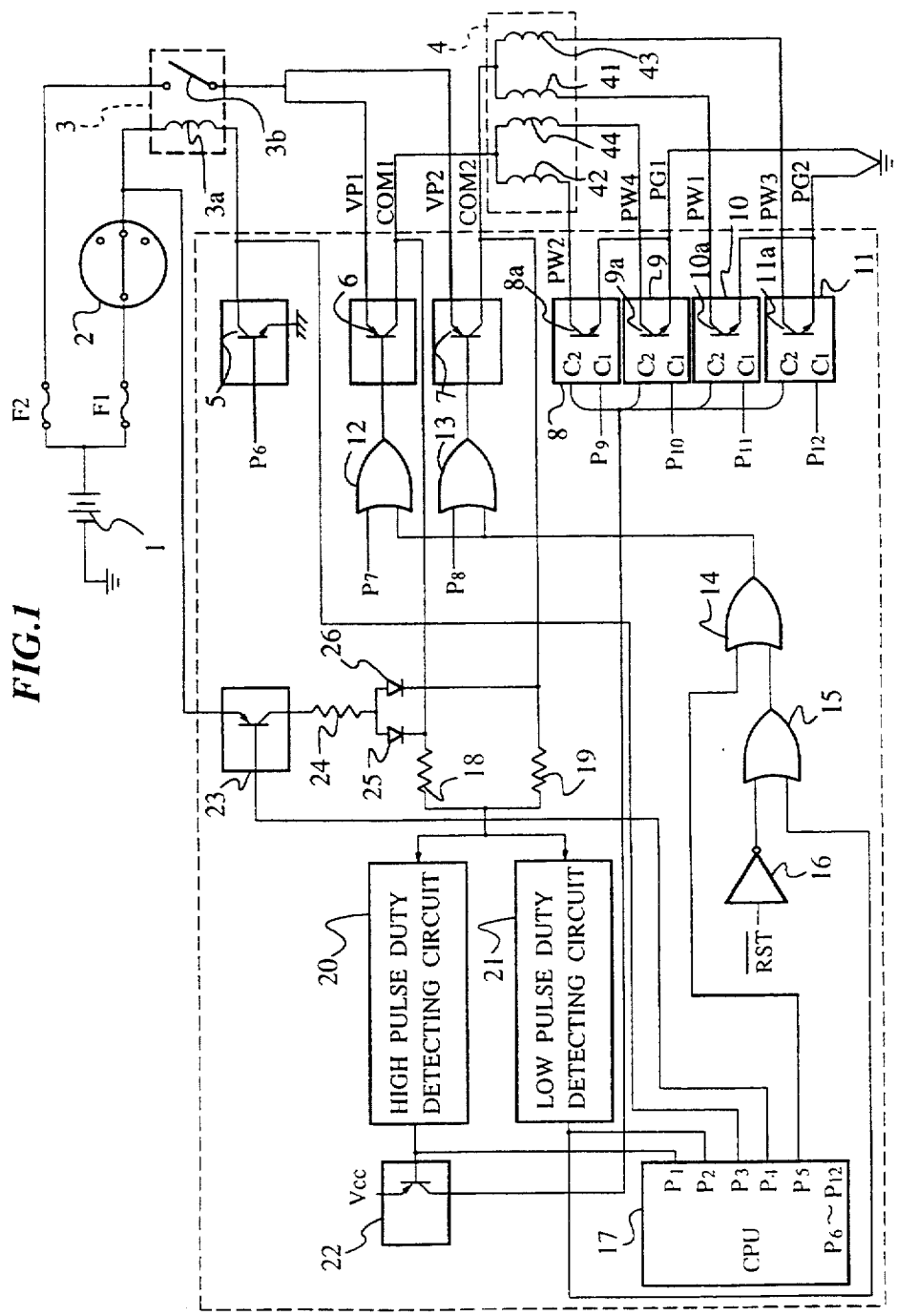

The HDTY circuit 20 and the LDTY circuit 21 have input and output characteristics as shown by the solid line and the broken line, respectively, in FIG. 3. More specifically, when the pulse duty factor of either one of the pulse signals on the lines $COM_1$, $COM_2$ exceeds 93%, the HDTY circuit 20 generates a high level output, whereas when the former is equal to or lower than 93%, the latter generates a low level output. On the other hand, the LDTY circuit 21 generates a high level output when the pulse duty factor of either one of the pulse signals on the lines $COM_1$, $COM_2$ is below 3%, and a low level output when the pulse duty factor is equal to or higher than 3%. Therefore, in the event of a short circuit between the emitter and the collector of the CHOPTR 6, for example, the pulse duty factor becomes 100%, and accordingly the output from the HDTY circuit 20 assumes a high level. Consequently, the PCUTTR 22 is turned off so that the second control input terminals $C_2$ of the motor exciting circuits 8-11 assume a low potential, irrespective of the potential level of the first control input terminal $C_1$, whereby the EXTR's $8a$-$11a$ are forcedly turned off and held off. Further, in the event that the line $COM_1$ is shorted to ground (hereinafter referred to as "grounding"), the pulse duty factor becomes 0%, and accordingly the output of the LDTY circuit 21 assumes a high level. Consequently, the OR circuits 15, 14 generate high level outputs, whereby the CHOPTR's 6, 7 are forcedly turned off and held off.

The CPU 17 has another output port $P_4$ connected to the base of a fault diagnosis transistor (hereinafter referred to as "CHKTR") 23. The CHKTR 23 has its emitter connected to a line connecting between the ignition switch 2 and the relay 3, and its collector connected to the anodes of diodes 25 and 26. The diodes 25, 26 have their cathodes connected to the lines $COM_1$, $COM_2$, respectively. The CHKTR 23, the resistance 24, and the diodes 25, 26 form a circuit for carrying out a fault diagnosis in response to a control signal from the CPU 17. The CHKTR 23 is normally held off.

the operation of the stepping motor driving circuit constructed as above will now be described.

When the ignition switch 2 is closed, the CPU 17 carries an initial fault diagnosis operation. If no fault is detected as a result of the diagnosis operation, the CPU 17 causes the FSRTR 5 to conduct so that the switch element $3b$ of the relay 3 is closed, whereby the stepping motor 4 is brought into an operable state. Even after completion of the initial fault diagnosis operation, the CPU 17 carries out a predetermined fault diagnosis operation at regular time intervals during operation of the stepping motor driving circuit, except when the stepping motor 4 is actually driven.

While no fault diagnosis operation is carried out by the CPU 17, the output ports $P_4$, $P_6$ of the CPU 17 are held at a high level, while the output ports $P_7$, $P_8$ are held at a low level. Further, on this occasion, the output port $P_5$ of the CPU 17 supplies a pulse signal having a pulse duty factor variable with output voltage from the battery 1 so that pulse signals are delivered from the CHOPTR's 6, 7 to the lines $COM_1$, $COM_2$, which have pulse duty factors controlled within the range of 3% to 93%. Therefore, on this occasion, the HDTY circuit 20 and the LDTY circuit 21 both generate low level outputs so that the PCUTTR 22 is held in on state, and the OR circuit 14 generates an output exactly corresponding to output from the output port $P_5$ of the CPU 17.

When driving pulse signals for driving the stepping motor 4 are generated from the output ports $P_9$-$P_{12}$ of the CPU 17, the respective EXTR's 81-11a are correspondingly turned on and off to apply driving pulses to the excitation coils 41-44 to thereby cause rotation of the stepping motor 4.

If there occurs a short circuit between the collector and the emitter of the CHOPTR 6, i.e. between the line $VP_1$ and the line $COM_1$, the HDTY circuit 20 generates a high level output, as mentioned before, to turn the PCUTTR 22 off. Accordingly, the second control input terminals $C_2$ of the motor exciting circuits 8-11 assume a low potential so that the EXTR's 8a-11a are forcedly turned off and held off, irrespective of the potential level assumed by the first control input terminals $C_1$, to thereby prevent excessive current from flowing to the excitation coils 42, 44 and the EXTR's 8a, 9a to do damage to them, such as burning.

The same operation as described above takes place also in the event of a short circuit between the lines $VP_2$ and $COM_2$.

On the other hand, in the event that the line $COM_1$ is shorted to ground, the output from the LDTY circuit 21 goes high, and accordingly the OR circuits 15, 14 generate high level outputs so that the CHOPTR's 6, 7 are forcedly turned off and held off, to thereby prevent excessive current from flowing to the CHOPTR 6 to do damage to them, such as burning.

The same operation as above also in the event of grounding of the line $COM_2$.

In the above described embodiment, it may alternatively be arranged such that the CPU 17 causes its output port $P_6$ to generate a low level output to thereby turn off the switch element 3b of the relay 3 when the output of the HDTY circuit 20 or the LDTY circuit 21 goes high.

Further, although in the above described embodiment, two chopping transistors, i.e. CHOPTR 6 which controls the supply of current to the second phase excitation coil 42 and the fourth phase excitation coil 44 of the stepping motor 4, and the CHOPTR 7 which controls the supply of current to the first phase excitation coil 41 and the third phase excitation coil 43, this is not limitative, but only one chopping transistor may be provided to control the supply of current to all the first phase to the fourth phase excitation coils.

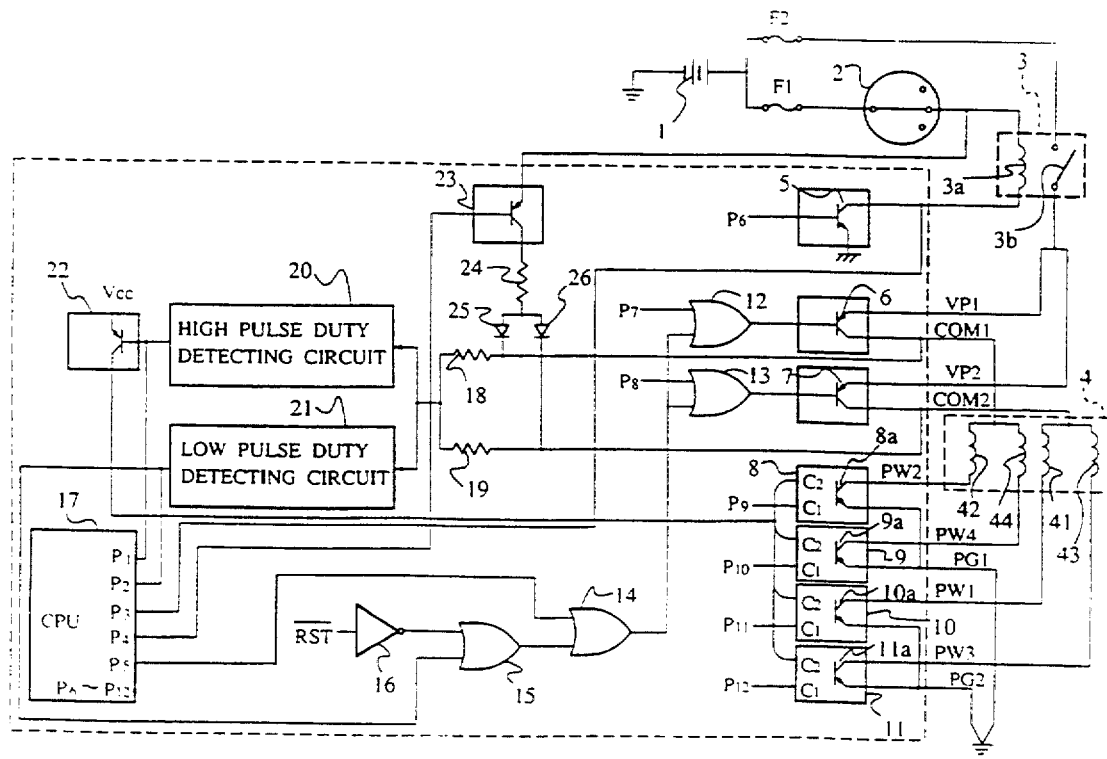

What is claimed is:

1. A driving circuit for driving a stepping motor having a plurality of excitation coils having different phases, comprising:
    a plurality of excitation transistors for driving said excitation coils of said stepping motor, respectively;
    at least one chopping transistor for effecting chopping control of current flowing to said excitation coils;
    control means for supplying at least one control signal to said at least one chopping transistor;
    detecting means for detecting whether said at least one control signal has a pulse duty factor thereof falling outside a predetermined range defined by predetermined upper and lower limit values; and
    interrupting means responsive to output from said detecting means for forcedly interrupting said supply of current to said stepping motor when said detecting means detects that said pulse duty factor falls outside said predetermined range.

2. A driving circuit for a stepping motor as claimed in claim 1, wherein said detecting means comprises a high pulse duty factor detecting circuit for detecting whether said pulse duty factor of said at least one control signal is higher than said predetermined upper limit value, and a low pulse duty factor detecting circuit for detecting whether said pulse duty factor of said at least one control signal is lower than said predetermined lower limit value.

3. A driving circuit for a stepping motor as claimed in claim 2, wherein said interrupting means causes said excitation transistors to be forcedly turned off when said high pulse duty factor detecting circuit detects that said pulse duty factor of said at least one control signal is higher than said predetermined upper limit value, and causes said at least one chopping transistor to be forcedly turned off when said low pulse duty factor detecting circuit detects that said pulse duty factor is lower than said predetermined lower limit value.

* * * * *

UNITED STATES PATENT AND TRADEMARK OFFICE
CERTIFICATE OF CORRECTION

PATENT NO. : 5,148,092  
DATED : September 15, 1992  
INVENTOR(S) : Ishii et al

Page 1 of 3

It is certified that error appears in the above-indentified patent and that said Letters Patent is hereby corrected as shown below:

The title page, showing an illustrative figure, should be deleted and substitute therefor the attached title page.

Delete drawing sheet 1 and substitute therefor the drawing sheet, consisting of fig. 1 as shown on the attached page.

Signed and Sealed this

Sixteenth Day of August, 1994

*Attest:*

BRUCE LEHMAN

*Attesting Officer*  *Commissioner of Patents and Trademarks*

United States Patent [19]

Ishii et al.

[11] Patent Number: 5,148,092
[45] Date of Patent: Sep. 15, 1992

[54] STEPPING MOTOR DRIVING CIRCUIT HAVING FAILSAFE FUNCTION

[75] Inventors: Yukihisa Ishii; Shinichi Inagawa, both of Wako, Japan

[73] Assignee: Honda Giken Kogyo K.K., Tokyo, Japan

[21] Appl. No.: 736,032

[22] Filed: Jul. 25, 1991

[30] Foreign Application Priority Data

Aug. 9, 1990 [JP] Japan .................................. 2-212230

[51] Int. Cl.⁵ .............................................. H02P 8/00
[52] U.S. Cl. ...................................... 318/696; 318/685
[58] Field of Search ................................. 318/685, 696

*Primary Examiner*—William M. Shoop, Jr.
*Assistant Examiner*—Karen Masih
*Attorney, Agent, or Firm*—Arthur L. Lessler

[57] ABSTRACT

A driving circuit for driving a stepping motor has a plurality of excitation coils, a plurality of excitation transistors for driving the excitation coils of the stepping motor, respectively, at least one chopping transistor for effecting chopping control of current flowing to the excitation coils, and a CPU for supplying at least one control signal to the at least one chopping transistor. High and low pulse duty factor detecting circuits detect whether the at least one control signal has a pulse duty factor thereof falling outside a predetermined range defined by predetermined upper and lower limit values. The CPU is responsive to outputs from the high and low pulse duty factor detecting circuits for interrupting the supply of current to the stepping motor when the latter detect that the pulse duty factor falls outside the predetermined range.

3 Claims, 2 Drawing Sheets